Dec. 19, 1961 P. I. ZANDBERG ET AL 3,013,804
CHUCKS
Filed Feb. 23, 1960 2 Sheets-Sheet 1
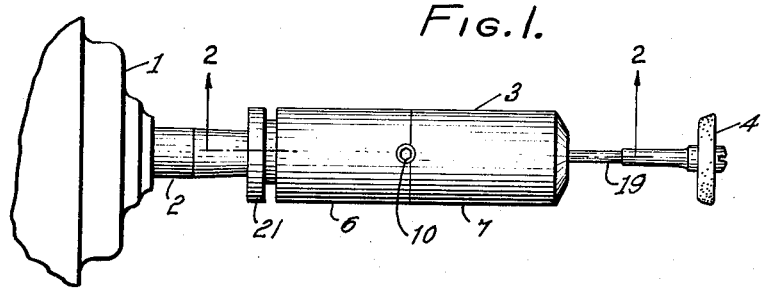
Fig. 1.
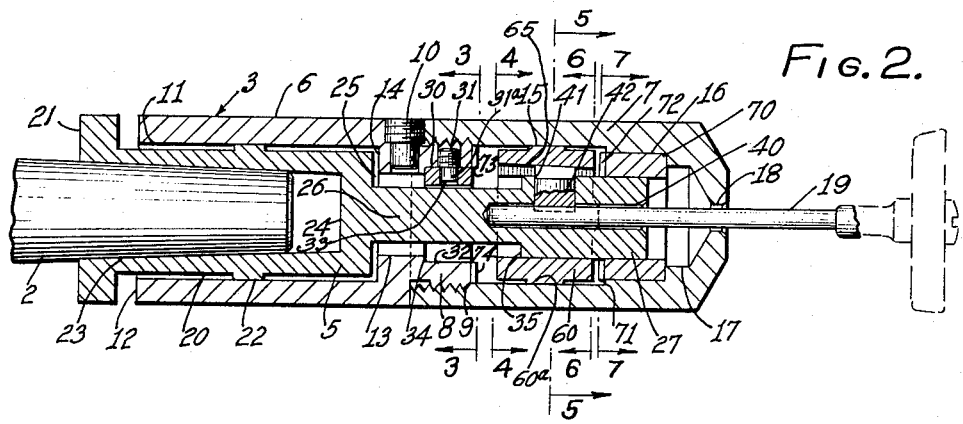
Fig. 2.
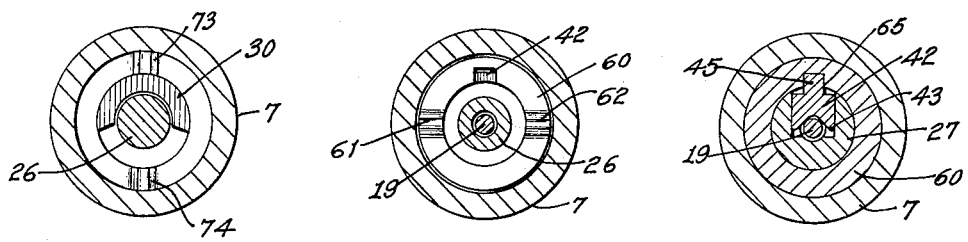
Fig. 3. Fig. 4. Fig. 5.
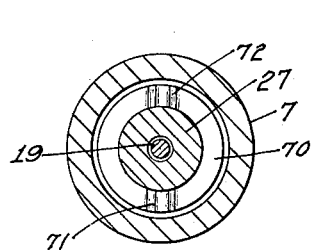
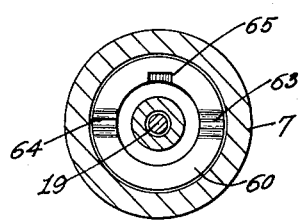
Fig. 6.
Fig. 7.
INVENTORS,
PAUL I. ZANDBERG,
BY MILTON L. LAPPIN;
ATTORNEY Dec. 19, 1961   P. I. ZANDBERG ET AL   3,013,804
CHUCKS
Filed Feb. 23, 1960   2 Sheets-Sheet 2
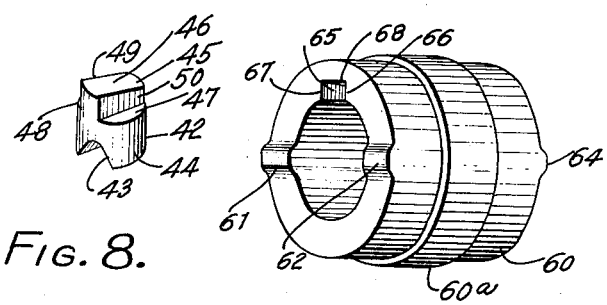
FIG. 8.   FIG. 9.
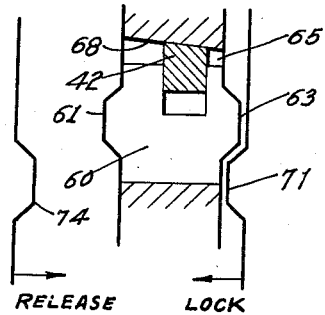
FIG. 10.
FIG. 11.
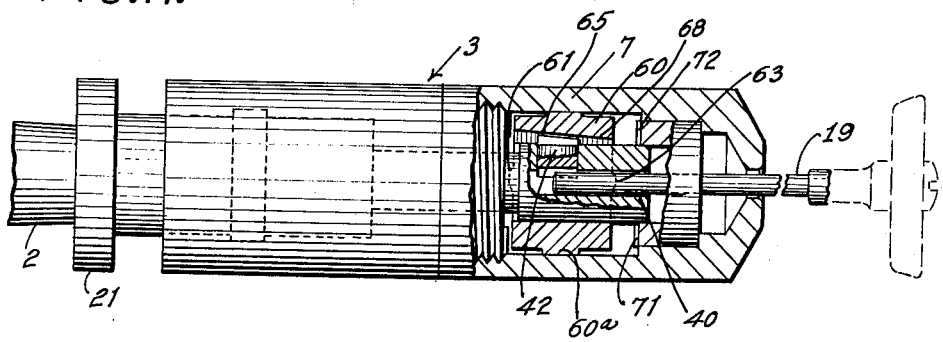
FIG. 12.
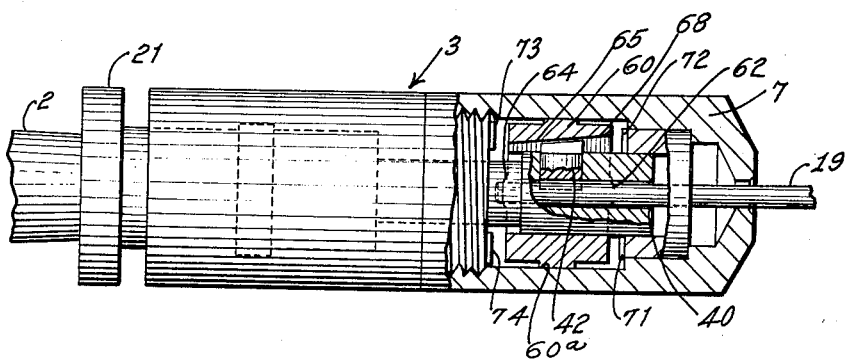
INVENTORS,
PAUL I. ZANDBERG,
BY MILTON L. LAPPIN;
ATTORNEY

United States Patent Office 3,013,804
Patented Dec. 19, 1961

3,013,804
CHUCKS
Paul I. Zandberg, 744 N. Martel Ave., and Milton L. Lappin, 2362 Westwood Blvd., both of Los Angeles, Calif.
Filed Feb. 23, 1960, Ser. No. 10,288
7 Claims. (Cl. 279—74)

The present invention relates broadly to chucks, and specifically to a type of chuck particularly adapted for use by manufacturing dental supply companies, dental technicians, jewelers, and commercial polishers.

An object of the present invention is to provide a chuck which will lock or release the stem of a tool such as a burr, by reciprocal movement of a floating grip during rotation of a motor, thus permitting the changing of the burr without stopping motor operation.

The average chuck requires relative movement between two parts in order to secure or release the stem of a drill, burr, arbor, or other tool. With the present invention, the stem of the burr or other tool is secured by mere reciprocation in one of two directions of the floating grip and released by an opposite movement of the floating grip with assurance that the chuck will hold the burr or other tool without slippage.

A further object is the provision of a chuck which locks the stem of a tool to be rotated, by a simple hammer action resultant upon a movement of the floating grip in one of two directions with the assurance that the stem of the tool so secured by the chuck cannot be pulled from the chuck or otherwise dislodged.

A further object is a chuck which is positive in its action, fool proof in operation, of few parts, and superior to chucks now known to the inventors.

In the drawings:

FIGURE 1 is a fragmentary, side elevation of the chuck of the invention shown as an entirety, secured to the shaft of a motor, the chuck securing the stem of a burr;

FIGURE 2 is a fragmentary, sectional view on the line 2—2 of FIGURE 1, and on an enlarged scale;

FIGURES 3 to 7 inclusive are sectional views respectively, on the lines 3—3 to 7—7 inclusive, of FIGURE 2;

FIGURE 8 is a perspective view of a pawl used in the practice of the invention;

FIGURE 9 is a perspective view of hammer means used in the practice of the invention;

FIGURE 10 is a diagrammatic, fragmentary, and partially sectional view to illustrate operation of the chuck;

FIGURE 11 is a fragmentary, partially sectional view showing one position of the parts of the chuck holding the stem of a burr, the chuck being in unlocked position; and, FIGURE 12 is a fragmentary, partially sectional view similar to that of FIGURE 11, certain of the parts being in reversed position from that of FIGURE 11, the chuck being in unlocked position.

Referring to the drawings, we have shown in FIGURE 1 a motor 1 with a shaft 2, and upon the shaft is mounted the chuck 3 of the invention, the chuck securing the stem of a burr 4.

The chuck 3 includes a mandrel 5 positioned within an axially aligned two-part casing or sleeve 6 and 7, the two casing parts adapted to be secured together in end to end relationship with both parts having the same external diameter. As shown, the casing part 6 has a reduced diameter screw threaded end extension 8, the threads of which are adapted to engage the internal threads 9 of the sleeve or casing part 7. When the two casing parts are joined, the parts may be held against relative separation by the use of a set screw 10 passed through a threaded opening between the parts 6 and 7, the set screw having an unthreaded shank portion received within a bore in the part 6, as best illustrated in FIGURE 2. The casing part 6 has a substantially uniform bore 11 from one end 12 thereof, and joins a reduced diameter bore 13 providing a shoulder 14. The shoulder 14 carries the threaded extension 8. The casing part 7 has an uniform internal bore 15, and reduced diameter bores 16 and 17 with the end of said casing provided with a small diameter bore 18 through which the stem 19 of the burr 4 is passed.

The mandrel 5 is externally shaped so as to be accommodated in the different diameter bores of the two casing parts. Thus, the mandrel has a substantially uniform external diameter portion 20 provided with an end flange 21, the diameter of which is substantially equal to the external diameter of the casing parts 6 and 7 and provided with an annular enlargement at 22 fitting within the bore 11 of the casing part 6, the mandrel being provided with a tapered bore or socket 23 which extends through the end flange 21 inwardly to wall portion 24 for receiving the tapered shaft 2 of the motor or other device for rotating the chuck. Axially extending from end 25 is a reduced diameter, cylindrical portion 26, which portion joins a further cylindrical part 27 having a diameter slightly greater than the diameter of portion 26. This portion 27, we designate as the mandrel head, while the portion which receives the shaft 2 we designate as the shaft receiving socket member while the part 26 is an intermediate connecting portion for the mandrel head and socket member. It is intended that the casing members 6 and 7 when in working relationship, that is to say, when screw threaded together, should be reciprocable upon the mandrel, and to prevent the mandrel from being removed from the two part casing a half ring 30 partly surrounds the connecting part 26, see FIGURE 3, and is held in position by means of a set screw 31 received in the threaded end extension 8 of casing 6 with the shank 31a of the set screw received within a bore 33 of the half ring 30. As shown, the half ring engages a shoulder 34 between the portion 32 and the bore 13. Thus, if the mandrel is moved to the left of the showing of FIGURE 2, the half ring will engage the annular shoulder 35 formed between connecting portion 26 and mandrel head 27, to stop outward movement of the mandrel from the casing parts 6 and 7. We have thus provided a simple form of restraint for the mandrel within the casing parts. The mandrel head 27 is provided with an axial bore 40 of sufficient length to accommodate a portion of the stem 19 of the burr 4. The mandrel head is provided with a radial bore 41 extending from the surface of the mandrel head to the bore 40. The bore 41 is adapted to receive a pawl 42 of the form shown in FIGURE 8. The bottom surface of the pawl is grooved at 43, the groove receiving the stem 19. The bounding wall of the groove may be curved and substantially overlie one half of the stem 19. The pawl, which is substantially cylindrical in part, as shown at 44, has its end opposite the grooved portion 43 provided with a cam block 45, which is parallel to the groove 43 and is reduced in width. The cam has an inclined top 46, that is inclined or of wedged form, relative to table portions 47 and 48 of the pawl. This provides the cam block with parallel side walls 49 and 50.

The pawl operates in conjunction with hammer means 60, shown in perspective in FIGURE 9. The hammer means comprises a cylindrical sleeve, each end being provided with diametrically disposed convex ribs, knockers or hammers 61 and 62 for one end, and 63 and 64 for the opposite end. These ribs, knockers, or hammers are substantially isosceles trapezoids in cross section. See FIGURE 10. The hammer means 60 is provided intermediate its ends with an annulus or ring 60a, the external diameter of which is slightly less than the internal diameter of bore 15 of casing part 7. The means 60 is provided with an internal groove 65 opening into the bore of said means and which groove extends longitudinally between the ends of the means and which groove has parallel side walls 66 and 67 and a base wall 68 which has the same taper or inclination as the inclination of the top 46 of the cam block. See specifically FIGURES 2, 11 and 12. The arrangement is such that the cam block of the pawl is received within the groove 65, the parallel side walls 49 and 50 lying adjacent the walls 66 and 67 to guide cam movement with the inclined base surface 68 in engagement with the inclined top 46 of the cam block. It is therefore evident from the specification as so far outlined, that movement of the hammer means in one direction or the other will cause radial movement of the pawl. The bore diameter of the hammer means is such as to accommodate the same upon the mandrel head 27 and hence, if the hammer means is held stationary with the pawl positioned within the bore 41 of the mandrel head, reciprocal movement of the hammer means would cause the pawl to either tightly engage the stem 19 or to be released from stem engagement. The ribs, knockers, or hammers 61 to 64 inclusive, are adapted to operate in conjunction with further ribs, knockers, or hammers positioned within the casing parts 6 and 7. Thus, the casing part 7 carries a sleeve 70 in press-fit engagement within the bore 16, the inner diameter of the sleeve being such as to accommodate the mandrel head 27 therein. Sleeve 70 has one end thereof provided with diametrically arranged rib, knocker, or hammer portions 71 or 72, and these portions are adapted at times to engage the ribs or hammer portions 63 and 64. The end of extension 8 is provided with hammers or ribs 73 and 74 in diametric relationship and which ribs or hammers are adapted to contact, under certain conditions, the ribs or hammers 61 and 62 of the hammer means 60.

The operation, uses and advantages of the invention just described, are as follows.

We assume that a dental burr and its stem are utilized, as shown in FIGURE 1, and that the several parts of the chuck are in the position shown in FIGURE 11. In the position shown in FIGURE 11, the pawl rides freely upon the stem 19 so that the stem may be removed from the bore 40 in the mandrel head 27. To lock the stem 19 within the mandrel head by means of the pawl, the casing parts 6 and 7 are moved to the left of the showing of FIGURE 11 which will bring the ribs, hammers or knockers 71 and 72 on the end of the sleeve 70 into engagement with ribs, knockers or hammers 63 and 64 on the end of the hammer means 60. As the hammers, ribs, or knockers have a camming action when brought together due to the form thereof, to wit: isosceles trapezoidal in cross section as shown in FIGURE 10, the casing will be reciprocated as it is held by the hand of the operator. There will be a constant tripping action between the ribs, knockers, or hammers and this action will move the hammer means to the left of the showing of FIGURE 11 causing the cam surface 46 of the pawl to move downwardly on the correspondingly inclined surface 68 of the hammer means forcing the curved groove portion 43 of the pawl into tight engagement with the stem 19. It is evident that the operator by grasping the periphery of the casing parts 6 and 7, which we term a floating grip, prevents rotation thereof when the motor shaft is turning as the hammer means 60 readily rotates within said casing, there being no positive connection between the casing parts and the parts under power rotation. To release the pawl from engagement with the stem 19, the operator grasps the floating grip and moves the same to the right of the showing of FIGURE 11 which brings the opposed knocker, hammer or rib members into engagement. In this instance the ribs, knockers, or hammers 61 and 62 engage like members 73 and 74 on the portion 8 of casing part 6. Such action will immediately release the pawl from the stem 19 and bring the cam portions into the position shown in FIGURE 11.

Under certain circumstances, an operator may release the stem 19 by an inward movement towards the motor instead of an outward movement as just described for FIGURE 11. In this case all that need be done is to reverse the positions of the hammer means 60 and of the pawl 42, as shown in FIGURE 12.

The device is simple of structure with parts not subject to failure and so far as wearability is concerned, this is easily taken care of by hardening the various parts entering into the construction of the device and particularly the hammer, knocker, or rib members so as to readily resist wear. The chuck device as an entirety may be made to any size and allows for fast change of various tools which have stems.

We claim:

1. A chuck, including: a mandrel formed at one end with a socket for receiving a motor shaft, and formed at its opposite end with a bore for receiving the stem of an instrument which is to be rotated, a sleeve surrounding the mandrel and provided with a longitudinally extending cam groove, a pawl provided with a cam block for reception in the bore which receives the stem, the cam block positioned in the cam groove of the sleeve, movement of the sleeve in one direction moving the pawl within the stem receiving bore, and movement in a second direction moving the pawl from said stem receiving bore, knockers for each end of the sleeve, a floating grip surrounding the mandrel and sleeve and movable axially relative to said mandrel, the floating grip internally provided with knockers for engagement with the knockers carried by the sleeve when the sleeve is moved in either direction.

2. A chuck, including: a mandrel, one end of which is formed with a socket for receiving the shaft of a motor and the opposite end of which is provided with an axial bore for receiving the stem of a tool to be rotated, a casing surrounding the mandrel and constituting a floating grip, the casing being slidable axially on said mandrel, hammer means in part surrounding the mandrel and within the casing, the hammer means comprising a sleeve both ends of which are provided with protruding ribs constituting knockers, said casing internally provided with ribs constituting knockers for contact with the knockers on the hammer means depending upon the direction of slide movement of the casing, said hammer means formed with longitudinally extending, internal cam groove, the mandrel formed with a transverse bore affording communication externally of the mandrel and internally to the stem receiving axial bore, a pawl fitted in the transverse bore of the mandrel, the pawl provided with a cam block received within the cam groove of the hammer means, movement of the hammer means in one direction causing the pawl to enter the stem receiving bore to engage the stem and lock the same to the mandrel, and movement of the hammer means in a second direction releasing the pawl from engagement with the stem, the knockers on one end of the hammer means when striking the knockers of the casing tightening the pawl against the stem in the stem receiving bore of the mandrel and when the casing is moved in an opposite direction, coaction between the casing knockers and the knockers of the hammer means effecting a release of the pawl from stem engagement.

3. The chuck of claim 2; and means limiting slide movement of the casing relative to the sleeve of the hammer means whereby the cam block is maintained within the cam groove.

4. The chuck of claim 1; and means between the floating grip and mandrel for limiting relative slide movement therebetween.

5. A chuck including: a two-part casing, said two parts being secured together in axial alignment; a mandrel axially received within said two-part casing, said mandrel having a socket portion for receiving the shaft of a motor, a head and a connecting piece between the head and socket portion, the mandrel head provided with an axial bore for receiving the stem of a burr; said two-part casing being slidable in two directions relative to the mandrel, and means limiting the slide movement of the two-part casing in each direction; hammer means comprising a sleeve surrounding the mandrel head and enclosed within the two-part casing, said sleeve formed at each end thereof with a knocker, and complementary knockers carried by the two-part casing for contact with the knockers on the sleeve when the two-part casing is moved in either direction, the sleeve of the hammer means internally provided with a cam groove extending between ends of the sleeve, a pawl provided with a cam block carried by the mandrel head and movable relative thereto in a transverse direction, the cam head positioned within the cam groove of the hammer means sleeve for effecting movement of the pawl into the bore of the mandrel head.

6. A chuck, including: a mandrel formed with an axial bore for receiving the stem of a burr, the mandrel provided with a transverse bore between the periphery thereof and the axial bore, a pawl within said transverse bore and provided with a cam head, means surrounding the mandrel and said pawl and provided with a cam portion for receiving the cam head of the pawl and for forcing the pawl inwardly toward the axial bore or outwardly thereof in accordance with movement of said means, and a floating grip surrounding said means and provided with internal knockers, said means provided with cooperative knockers adapted to contact the knockers of the floating grip depending upon slide movement of the floating grip.

7. A chuck, including: a power driven mandrel having a head formed with an axial bore adapted to receive the stem of a burr, the mandrel head provided with a transverse bore between the periphery of the mandrel head and the aixal bore, a pawl positioned in said transverse bore and provided with a cam block, a sleeve surrounding the cam head and provided with a cam groove extending between ends of the sleeve for receiving the cam block of the pawl, movement of the sleeve producing inward or outward movement of the cam block and pawl in the transverse bore of the mandrel head to lock or unlock the stem of the burr positioned in the axial bore, knocker elements on each end of the sleeve and further knocker elements for contact with the knocker elements of the sleeve dependent upon relative movement between said knocker elements to move the sleeve and thereby move the pawl into and out of stem engagement.

References Cited in the file of this patent
UNITED STATES PATENTS

| | | |
|---|---|---|
| 2,386,469 | Iversen | Oct. 9, 1945 |
| 2,430,761 | Duphilt | Nov. 11, 1947 |